3,235,326
PREPARATION OF GRANULAR THORIUM DIOXIDE
Hans S. G. Slooten, Arnhem, Netherlands, assignor to Stichting Reactor Centrum Nederland, The Hague, Netherlands
No Drawing. Filed Sept. 16, 1960, Ser. No. 56,354
Claims priority, application Netherlands, Sept. 16, 1959, 243,409
5 Claims. (Cl. 23—14.5)

The present invention relates to a process for preparing granular thorium dioxide.

In a known process of this kind, an emulsion of a hydrosol of a thorium oxide in a liquid which is substantially immiscible with water, e.g., a liquid hydrocarbon, is prepared and a basic substance, e.g., ammonia, is added to the emulsion.

When granular thorium dioxide is to be utilized as the fertile material in nuclear reactors employing a suspension or slurry of granular nuclear fuel in a carrier liquid, e.g. in the case of a thorium oxide blanket slurry, it is advantageous to dispose of a process capable of producing granular thorium dioxide of sharply defined very uniform particle size without the subsequent application of complicated separation of classification methods being necessary, while it is of additional advantage if important properties of the material—in particular a perfectly spherical shape and a smooth surface—may be obtained in a reproducible manner.

The results of the above-indicated known process do not come up to the exceedingly high demands which have to be made on granular thorium dioxide to be used for the said purpose. Not only do deviations from the desired particle size and from the spherical shape occur, but also cracks or pits are formed in the resulting gel granules, while on the other hand these granules tend to coalesce. Moreover, fracture of the granules occurs sometimes in the drying or calcining process to which the granules are to be subjected often afterwards.

It is the main object of the invention to provide a process of the kind specified yielding a product meeting a very high standard as regards the properties hereinbefore mentioned, notably, as regards particle size and spherical shape.

Further objects of the invention will appear from the following description, from the annexed example which is given for purposes of elucidation and not of limitation, and from the appertaining claims.

Acording to the invention, in a process for preparing granular thorium dioxide of very uniform particle size and perfectly spherical shape suitable for use as the fertile material in nuclear reactors employing a suspension or slurry of granular nuclear fuel in a carrier liquid, there is prepared an emulsion of a hydrosol of thorium oxide in a liquid which is substantially immiscible with water and separately, there is prepared a solution of a basic substance having a high diffusion coefficient in a body of the same water-immiscible liquid, and subsequently the said emulsion is mixed with the said solution under vigorous stirring.

By a "basic substance having a high diffusion coefficient" there is here understood a basic substance which may penetrate comparatively rapidly from the water-immiscible liquid into the dispersed sol drops.

Suitable water-immiscible liquids for use in the process according to the invention are, for example, toluene or carbon tetrachloride.

Preferably, ammonia is used as the basic substance having a high diffusion coefficient. Also hexamethylene tetramine can very well be applied.

With the improved process according to the invention there may be obtained thorium dioxide showing a size distribution curve with one very sharp maximum and consisting of granules of perfectly spherical shape.

An important additional advantage of the process according to the invention is that the prolonged aging process to which the resulting gel granules have usually afterwards to be subjected in the known art may be omitted completely.

The invention will be elucidated with reference to the following illustrative example.

*Example*

3 litres of a 4-molar thorium hydroxide sol is emulsified in 50 litres of toluene. The sol drops have a mean particle size of 30 microns. To the emulsion 20 litres of toluene saturated with ammonia is added while vigorously stirring. The diluted emulsion thus obtained is mildly agitated for one hour to prevent settling, and is subsequently filtered. The solid residue consists of gel globules with a size distribution curve having a sharp maximum at 30 microns. Drying and subsequent calcination resulted in a granular thorium dioxide with a size distribution curve having a sharp maximum at 15 microns.

I claim:

1. In a process for preparing granular thorium dioxide of very uniform particle size and perfectly spherical shape suitable for use as the fertile material in nuclear reactors employing a suspension or slurry of granular nuclear fuel in a carrier liquid, the steps of preparing an emulsion of a hydrosol of thorium oxide in an organic liquid which is substantially immiscible with water, separately preparing a solution of ammonia in a body of the same water-immiscible liquid, subsequently mixing the said emulsion and the said solution under vigorous stirring, and thereafter recovering granular thorium dioxide having a particle size up to 15 microns by drying said mixture.

2. Process according to claim 1, wherein the water-immiscible liquid is toluene.

3. A process according to claim 1 wherein the water immiscible liquid is selected from the group consisting of toluene and carbon tetrachloride.

4. In a process for preparing granular thorium dioxide of very uniform particle size and perfectly spherical shape suitable for use as the fertile material in nuclear reactors employing a suspension or slurry of granular nuclear fuel in a carrier liquid, the steps of preparing an emulsion of a thorium hydroxide sol in an organic liquid which is substantially immiscible with water, separately preparing a solution of ammonia in a body of the same water-immiscible liquid, subsequently mixing the said emulsion and the said solution under vigorous stirring, and thereafter recovering granular thorium dioxide having a particle size up to 15 microns by drying said mixture.

5. A process according to claim 4 wherein the water-immiscible liquid is selected from the group consisting of toluene and carbon tetrachloride.

References Cited by the Examiner

UNITED STATES PATENTS

| | | | |
|---|---|---|---|
| 1,151,187 | 8/1915 | Keetman | 23—14.5 |
| 1,775,640 | 9/1930 | Griessbach | 23—14.5 |
| 2,202,637 | 5/1940 | Muller | 23—14.5 |
| 2,816,122 | 12/1957 | Fisher | 23—14.5 |

(Other references on following page)